United States Patent Office 3,448,567
Patented June 10, 1969

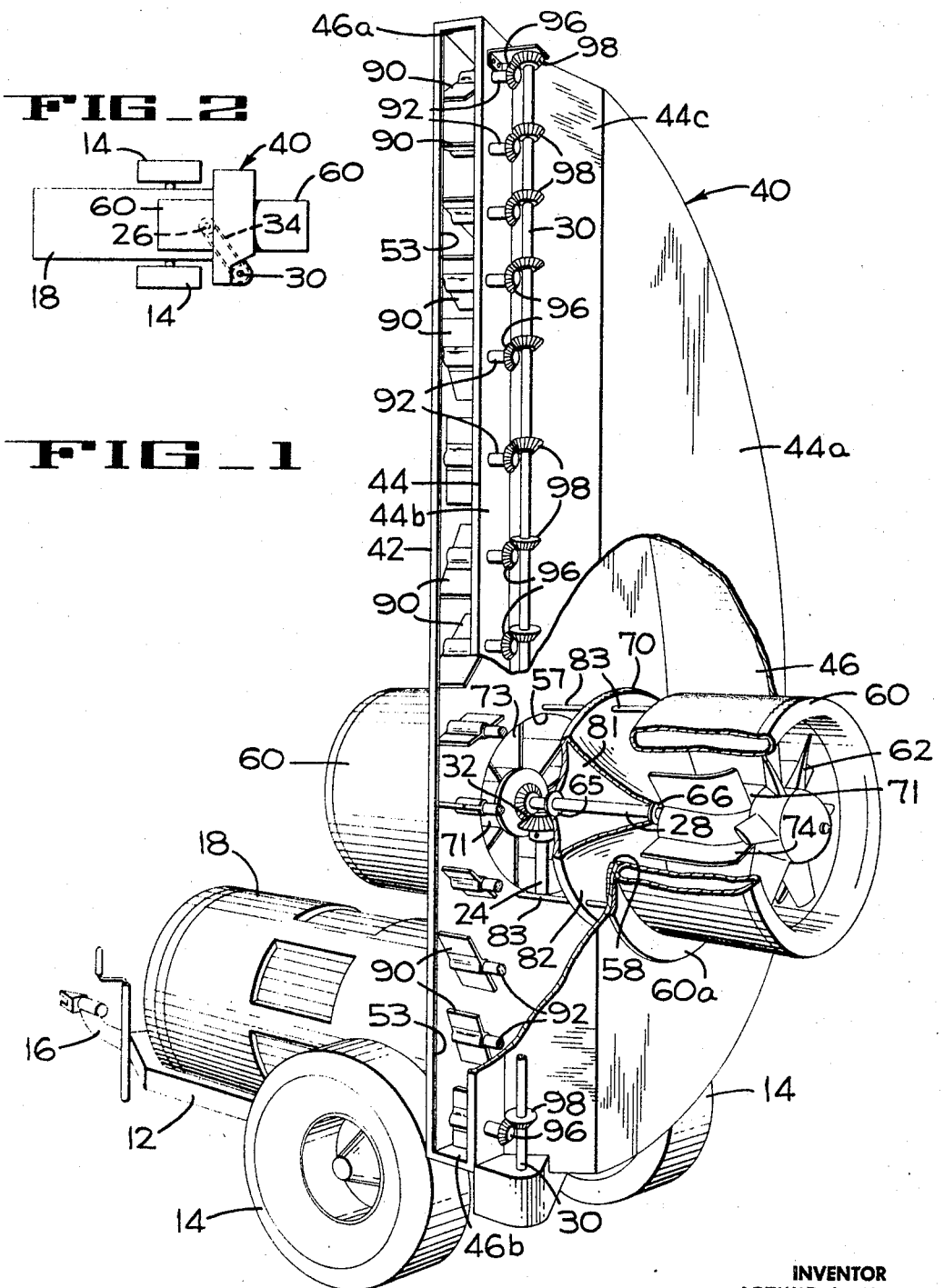

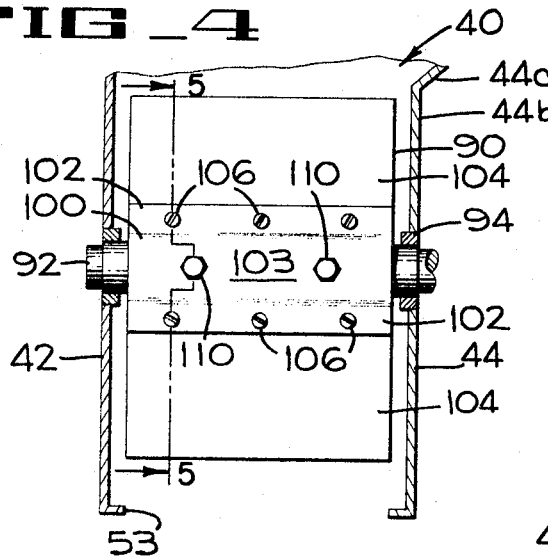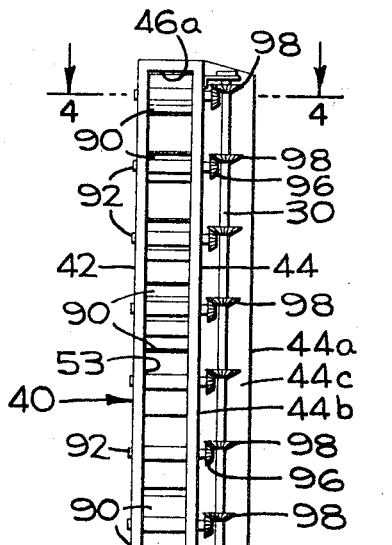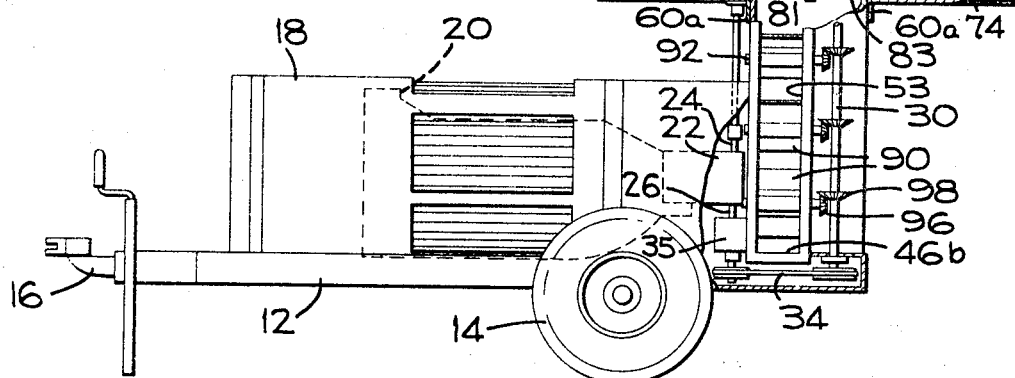

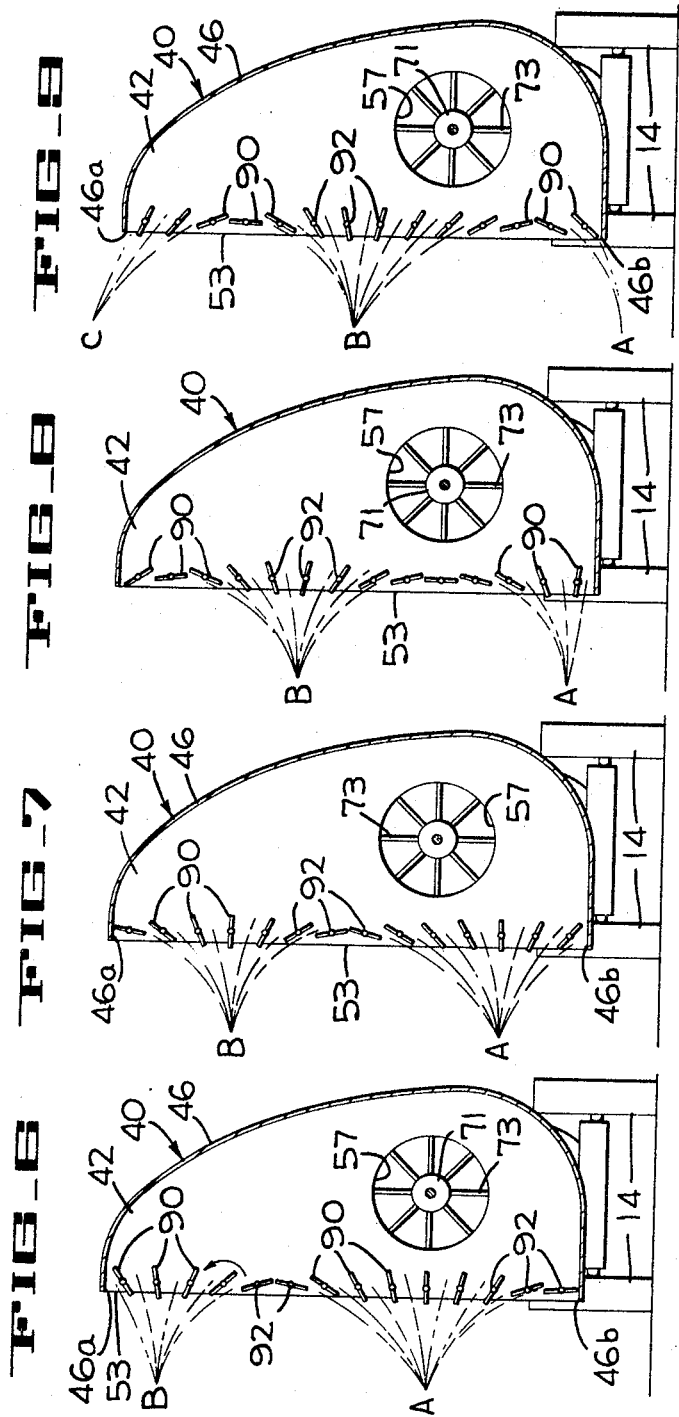

3,448,567
APPARATUS FOR HARVESTING FRUIT GROWING ON TREES
Arthur L. McGee, San Jose, Calif., assignor to FMC Corporation, San Jose, Calif., a corporation of Delaware
Filed June 13, 1966, Ser. No. 557,225
Int. Cl. A01g *19/08*
U.S. Cl. 56—328                                 3 Claims

ABSTRACT OF THE DISCLOSURE

A blower has a housing with a discharge opening aligned in a vertical plane for directing an air current towards a tree to be harvested. A multiplicity of discharge control vanes are mounted within the housing adjacent the discharge opening and are aligned to direct the air current generated by the blower towards at least two focal points spaced in vertical relationship to each other and separated by an area of substantially no air flow. Means are provided for rotating the discharge control vanes in synchronism with each other, causing the focal points of air current to move downwardly along the side of the tree at a rate sufficient to minimize the duration of impingement of the high velocity air current upon any individual tree leaf and at a time interval between each focal point of air current to induce resonant oscillation in the tree limbs causing fruit to snap therefrom.

---

The present invention pertains to harvesting of fruit from orchard trees, and more particularly concerns a machine for harvesting citrus fruit by means of high velocity air currents.

In order to conserve space, it is common practice in citrus orchards to plant the rows of trees and the trees in each row close together. The sides of the trees in the rows are frequently trimmed hedge style to admit a maximum amount of sunlight and for access to all sides of the trees by cultivators, sprayers and other agricultural vehicles such as the present invention. Close interspacing and trimming of the trees causes their foliage or leaves to be very dense and causes the limbs to be shorter than usual. As a result, harvesting of the fruit growing on the trees is rendered more difficult either manually or by well known mechanical shaker mechanisms. The difficulty arises from the increased inability to locate and gain access to the limbs or the fruit of the trees. In addition, the shorter limbs are more difficult to shake. It has been found that mechanical shakers, which grip and oscillate tree limbs, are relatively ineffective when particular portions of the limbs correspond to fixed nodes of the waves induced in other parts of the oscillating limbs. Consequently, fruit near or at the nodes tend not to be detached, even though the adjacent limb portions are violently vibrated.

In the past there have been developed various kinds of air blast machines for dislodging fruit from trees. These prior machines generally operate by directing a high velocity column of air against the side of a citrus tree whereby the momentum of the air penetrates through the foliage and impinges against the hanging citrus fruit with sufficient force to cause the fruit to be snapped from the limb. It has been found, however, that in order to provide enough force to snap off the fruit, the high velocity column of air severely damages the leaves of the tree.

Other devices have been developed which direct a high velocity stream of air against the side of a citrus tree, but the direction of the stream of air is constantly changed thereby minimizing the time that the column of air is impinging directly upon any one individual leaf. This system has been found effective since there is a time lag between application of the high velocity stream of air and the time that the leaf actually suffers damage. In other words, the high velocity stream of air must act on a leaf for a sufficient duration of time before the leaf is damaged or severed from the limb. Nonetheless, this type of device still requires a high velocity stream of air in order to snap off or remove the fruit from the limbs. This type of apparatus has been found to also induce a slight amount of deflecting or oscillation of the limbs. Such induced oscillation has been found to aid removal of the fruit from the limbs. This induced oscillation aids the removal of the fruit since, as the limb is deflected to one side by the high velocity stream of air on the leaves, the inertia of the fruit tends to sever the stem of the fruit from the limb. However, merely moving the stream of air about does not effectively shake or oscillate the limbs with sufficient amplitude to cause a high percentage of the fruit to be snapped off the limbs.

It has been found that the dense foliage of trees trimmed, as hereinbefore described acts much like a sail when a blast of air having a large cross section impinges on the side of a tree. Thus, the tree tends to be pushed in a direction away from the source of the high velocity air blast is biased in that direction as long as the air blast continues to impinge upon the side of the tree.

It is therefore, an object of the present invention to provide an improved fruit harvesting machine.

Another object of the present invention is to provide a fruit harvesting machine which requires no attachments to the tree and which can harvest fruit while being continuously moved past the trees.

A further object of the present invention is to provide an efficient harvesting machine which will minimize damage to limbs and foliage of the trees.

A further object of the present invention is to provide means for generating an air blast against the side of a tree in order to efficiently and effectively oscillate the limbs of the tree to sever the fruit therefrom.

A still further object of the present invention is to provide a fruit harvesting machine which requires access to only the sides of the tree rows.

The harvesting machine of the present invention contemplates removal of fruit from trees by directing a stream or current of air having a relatively small cross sectional area against first one portion and then another portion of the side of a fruit tree. The directing of a high velocity stream of air against different portions of the tree is provided with a frequency such that an oscillation is induced in the limbs of the tree, and this oscillation develops an amplitude and frequency such that the inertia of the fruit hanging or growing on the limbs is sufficient to cause the fruit to be snapped or severed from the limbs. In addition, the time duration of the high velocity air blast directed against any one portion of the side of the tree is of short duration and, accordingly, the leaves are not ripped or severed from the tree itself.

Other objects and advantages of the present invention will become more apparent when the following description is read in conjunction with the accompanying drawings wherein:

FIGURE 1 is a schematic perspective, partially broken away to show inner structure otherwise concealed, of the fruit harvesting machine of the present invention.

FIGURE 2 is a schematic plan of the machine of FIG. 1 shown at a reduced scale.

FIGURE 3 is a reduced schematic side elevation of the machine shown in FIG. 1 partially broken away to disclose the drive train.

FIGURE 4 is an enlarged horizontal fragmentary section taken along lines 4—4 in FIG. 3, and particularly illustrates the air throat and means for causing the air current to be restricted.

FIGURE 5 is an enlarged cross-section along the lines 5—5 of FIG. 4 showing the mounting of an individual vane on its drive shaft.

FIGURES 6-9 are diagrammatic views showing consecutive positions of the vanes of the unit and showing in phantom lines the major air stream that contribute to make up a phased delivery of air.

The preferred embodiment of the harvesting machine of the present invention is shown in FIG. 1 as including a frame 12, which is supported by wheels 14 suitably journalled thereon, and a forwardly projecting draft arm 16 that may be coupled to an orchard truck, tractor or other propulsion means.

As more clearly illustrated in FIG. 3, a conventional sheet metal housing 18 is mounted on frame 12 to enclose a conventional gasoline engine power unit indicated generally by the dotted outline 20. The power unit 20 includes a transmission 22 which has two separate vertically disposed transmission output shafts, an upper shaft 24 and a lower shaft 26. Upper shaft 24 drives a horizontally positioned blower drive shaft 28. Lower shaft 26 drives a vertically disposed vane-operating drive shaft 30. The blower drive shaft 28 is coupled to the upper transmission shaft 24 by means of a bevel gear drive train 32. The drive shaft 30 is coupled to the lower transmisison shaft 26 by a belt and pulley drive train 34 (FIG. 2) and an intermediate variable speed transmission 35 (FIG. 3). The intermediate transmission 35 permits rotation of the vane-operating drive shaft 30 at various speeds different than the speed of blower drive shaft 28. It is preferable that the intermediate transmission 35 be of the type wherein its drive ratio may be varied while transmitting power. For this purpose, any one of a plurality of well-known variable speed belt transmissions may be used, or the vane-operating shaft 30 may be coupled to a hydraulic motor that is driven by fluid under pressure from a suitable hydraulic pump coupled to the power unit 20, and controlled in the usual manner by a manually operated valve which regulates the flow of fluid through the motor.

An air housing 40, including a vertically disposed front wall 42 and a rear wall 44, is mounted on the machine at the rear of frame 12. The rear wall 44 has two flat portions 44a and 44b connected by a slanted portion 44c, and a curved side wall 46 is connected to the marginal edges of the walls 42 and 44 to form an enclosure which provides an air pressure and distribution chamber. A discharge opening 53 is defined at one side of the housing by the edges of the walls 42 and 44 and the upper and lower edges 46a and 46b of the curved wall 46. The vertical extent of the discharge opening 53 is approximately the same as the distance between the lowermost and uppermost foliage of the tallest trees to be harvested.

The housing walls 42 and 44 are provided with aligned circular apertures 57 and 58 respectively (FIG. 3) and a cylindrical blower housing 60 is secured adjacent each opening, each blower housing having a flange 60a secured to the adjacent wall. An impeller 62 (one only being shown) is mounted in the outer end portion of each blower housing, each impeller being keyed to the blower drive shaft 28 which is supported in spaced bearings 65 and 66 of air deflector head 70 and also extends freely through hubs 71 of two air straightening vane units 73 and 74 that are secured in fixed position in the blower housings. The deflector head is in the form of two generally bell-shaped members 81 and 82 that are integrally joined at their outer peripheral edges and are supported by four rigid rods 83 (two only being shown). The rods 83 are spaced at 90 degree intervals and are rigidly secured to the walls 42 and 44 of the air housing 40 and pass through apertures in the bell shaped members 81 and 82.

It should be noted that the chamber provided by housing 40 does not require the particular dual blower arrangement illustrated since a continuous high volume high velocity current of air may be delivered to the discharge opening 53 by any one of various well-known air generating and transmitting means including centrifugal blowers and directional walls to apportion the air and obtain the desired air balance within the chamber.

Egress control of high velocity air through different portions of the discharge opening 53 is provided by mounting a plurality of movable discharge control vanes 90 in the housing 40 adjacent the opening 53. As illustrated in FIGS. 1 and 2, a plurality of vane supporting and actuating rods 92 are mounted horizontally in the housing 40 for rotation about their longitudinal axes. The rods 92 are disposed one above the other in a substantially vertical plane and spaced apart equidistantly from each other. One end of each rod 92 extends outward through a bearing 94 (FIG. 3) toward the rear side of the housing 40. The rear end of each rod 92 has secured thereon a bevel gear 96 which is disposed adjacent to the shaft 30. A plurality of bevel gears 98 are securely disposed upon shaft 30, each bevel gear 98 being in mesh with a bevel gear 96. Upon rotation of shaft 30 the rods 92 are rotated in synchronism with each other.

As more clearly illustrated in FIGS. 4 and 5, each air discharge control vane 90 includes two mounting bracket halves 100 disposed on opposite sides of a rod 92. Each bracket half includes two flanges 102 connected by an arcuate portion 103. Thus each flange of a bracket half is disposed opposite a flange of the other bracket half with a space therebetween.

One edge of a generally flat plate or vane member 104 is positioned within the space between opposed flanges 102 and secured thereto by means of bolts 106 and nuts 108. Lock bolts 110 are secured into threaded holes 112 formed in the curved portion of the bracket halves 100 and into firm engagement with the rod 92 in order to secure the discharge control vane 90 against slippage axially and circumferentially on the rod 92. As will be explained more fully hereinafter, the lock bolts 110 also permit changing of the angular disposition of the vanes 90 about the rods 92. Upon rotation of the shaft 30, the vanes 90 are rotated in synchronism with each other.

It is to be noted that the discharge control vanes 90 are not all disposed at the same angle with respect to a horizontal at the same instant of time. As shown clearly in FIG. 6, at a particular instant during the rotational cycle of the vanes 90, the upper group of vanes are arranged and disposed such that the air leaving the upper portion of the discharge opening 53 converges to a general focal point B. The focal point B is generally located adjacent the side of a tree. The lower group of vanes 90 is seen to have its vanes disposed and arranged such that the air leaving the lower portion of opening 53 is directed to a second focal point A generally located adjacent the tree at a point vertically below the point B. There is thus impinging on the side of the tree two vertically spaced apart currents or streams of air. There is generally no substantial air flow against the side of the tree at points between A and B.

If it be assumed that the direction of rotation of the vanes 90 in FIGS. 6-9 is counter-clockwise as viewed from the rear of the machine, it is apparent that the focal points A and B move in a downward direction. Thus it is evident that large masses of high velocity air are directed to spaced points adjacent the side of the tree, and the points move downwardly along the side of the tree. Referring to FIG. 9, it will be noted that as focal point A disappears, a new focal point C appears at the upper end of the air pattern.

Vanes 90 can be preset at desired angular positions with respect to each other by loosening lock bolts 110, adjusting the vanes 90 about the rods 92, and then retightening the bolts 110. If the vanes 90 are preset such that the angular deviation or phase difference between vanes 90 is greater than that shown, the focal points A and B will be located closer to the opening 53 than that shown. Depending upon how close the harvesting machine of the present invention may be located adjacent the sides of the trees, the vanes are preset accordingly to direct high velocity, high volume currents of air against relatively small portions of the side of a tree.

As previously mentioned, it has been found that when citrus trees are close cropped, such as contemplated in the use of the present invention, the large number of leaves grow quite close together. Thus the foliage is thick and dense. It has been found that when a high velocity current of air covering a relatively large cross-sectional area impinges against the side of a heavily foliated tree, the leaves act together in such a manner that the side of the tree acts like a sail. The limbs inside of the side of the tree tend to be pushed to one side by the force of the air on the leaves. Of course, if the current or stream of air is of a high enough velocity, the air stream inself pushes the leaves aside and penetrates through the side of the tree into its interior. It has been found, however, that an air blast that pushes the leaves aside to enter substantially into the interior of the tree tends to damage the leaves. Also, it has been found that the damage to the leaves does not take place instantly upon application of a high velocity air stream. There has been found to be a time lag between the application of the air stream and actual occurrence of damage to the leaves. A particularly important advantage of the present invention is in minimizing or substantially eliminating the possibility of damage to the leaves of a citrus tree as it hereinafter explained. As each concentrated air stream (focal points A and B) sweeps downward over the surface of the side of the tree successively lower portions of the leaves on the side of the tree act as small sails. Thus successively lower located limbs within the interior of the tree are pushed aside or toward the trunk of the tree. After passage of an air stream across a particular small area on the side of the tree, the inward pushing force on the limbs is released. Release of the inward pushing force permits the natural resiliency of the limbs to cause the limbs to spring back and possibly overshoot their former stationary normal location. Shortly thereafter another downwardly moving air stream is swept across the surface of the tree. Once again particular limbs on the tree are pushed inward and again released. By timing the sweeping of the air stream across the surface of the tree to substantially match the natural resonant oscillation frequency of the limbs, sustained oscillation is induced in the limbs.

Citrus fruit growing on the tree hangs from the limbs of the tree by their short stems in a manner substantially identical to a simple pendulum. Since the citrus fruit itself is substantially free to oscillate about a povit point generally defined by the connection point of the stem to the limb, the fruit themselves are caused to oscillate. However, oscillation frequency of a citrus fruit is generally quite different than the resonant oscillation frequency of the limbs. Since the oscillation frequencies of the limbs and the citrus fruit are different, the fruit are generally not following the speed or direction of movement of the limbs. There is thus a snapping action on the cirtus fruit stems. Since the citrus fruit is of a relatively large mass or inertia, the citrus fruit tend to be snapped off the limbs as the limbs oscillate.

Thus by means of a moving air stream the limbs of the citrus tree are set into substantial resonant oscillation thereby causing the citrus fruit growing on the limbs inside the surface of the tree to be removed without having to depend upon the force of a very high velocity air stream itself to impinge on the citrus fruit with consequent serious damage to the leaves of the tree.

While a particular embodiment of the present invention has been shown and described it will be understood that the fruit harvester of the present invention is capable of modification and variation without departing from the principles of the invention and the scope of the invention is to be limited only by the scope and proper interpretation of the claims appended hereto.

What is claimed and described to be protected by Letters Patent of the United States is:

1. In an apparatus for harvesting fruit growing on the limbs of trees, means for generating a high velocity air current; means for directing a first portion of the air current towards the side of a tree; means for directing a second portion of the air current towards the side of the tree in spaced relationship to the first portion of the air current and separated therefrom by an area of substantially no air flow; and means for controlling said directing means to cause the first and second portions of the air current to move vertically along the side of the tree at a rate sufficient to minimize the duration of impingement of the high velocity air current upon any individual tree leaf and at a time interval between each portion of air current to induce resonant oscillation in the tree limbs causing the fruit to snap therefrom.

2. A fruit harvesting apparatus comprising a blower for generating a high velocity air current, a housing for channeling the air current from the blower toward a tree to be harvested, said housing having a discharge opening aligned in a vertical plane, a multiplicity of discharge control vanes mounted within the housing adjacent the discharge opening in vertical spaced relationship, said discharge control vanes being aligned to converge outwardly of the discharge opening to direct the air current towards at least two focal points in vertical spaced relationship to each other and separated by an area of substantially no air flow, and means for rotating said discharge control vanes in synchronism with each other causing the focal points of air current to move downwardly along the side of the tree at a rate sufficient to minimize the duration of impingement of the high velocity air current upon any individual tree leaf and at the time interval between each focal point of air current to induce resonant oscillation in the tree limbs causing fruit to snap therefrom.

3. A fruit harvesting apparatus as described in claim 2, wherein said means for rotating said discharge control vanes in synchronism with each other include a separate actuating rod mounting each discharge control vane disposed horizontally in the housing adjacent the discharge opening and spaced one above another in a substantially vertical plane equidistant apart, a bevel gear fixed to the end of each actuating rod, a drive shaft mounted in a vertical plane adjacent the bevel gears at the end of each actuating rod, a multiplicity of bevel gears fixed to the drive shaft and in mesh with the bevel gears on each actuating rod, and drive means for rotating said drive shaft, whereupon rotation of the drive shaft causes said discharge control vanes to rotate in synchronism with each other.

References Cited
UNITED STATES PATENTS

| | | | |
|---|---|---|---|
| 2,279,425 | 4/1942 | Voysey | 230—274 X |
| 3,006,131 | 10/1961 | McDowell | 56—330 |
| 3,310,231 | 3/1967 | Wininger | 230—274 |

LUCIE H. LAUDENSLAGER, *Primary Examiner.*